United States Patent [19]

Whitesell

[11] Patent Number: 5,244,327
[45] Date of Patent: Sep. 14, 1993

[54] TRAILER BED FASTENER

[76] Inventor: Neil L. Whitesell, P.O. Box 2571, Muscle Shoals, Ala. 35661

[21] Appl. No.: 875,738

[22] Filed: Apr. 29, 1992

[51] Int. Cl.$^5$ .................. F16B 25/00; F16B 35/04
[52] U.S. Cl. .................. 411/386; 411/412; 411/416
[58] Field of Search .............. 411/386, 387, 416, 417, 411/418, 412

[56] References Cited

U.S. PATENT DOCUMENTS

| | | | |
|---|---|---|---|
| 3,461,470 | 8/1969 | Cochrum | 411/416 |
| 3,681,963 | 8/1972 | Muenchinger | 411/416 |
| 3,876,319 | 4/1975 | Meyer | 403/343 |
| 4,315,340 | 2/1982 | Veldman | 411/416 |
| 4,323,326 | 4/1982 | Okada et al. | 411/412 |
| 4,439,077 | 3/1984 | Godsted | 411/411 |
| 5,044,855 | 9/1991 | Fukubayashi | 411/416 |

FOREIGN PATENT DOCUMENTS 780160  3/1968  Canada ................ 411/416
2131907  of 1912  United Kingdom .

Primary Examiner—Neill R. Wilson
Attorney, Agent, or Firm—I. C. Waddey, Jr.

[57] ABSTRACT

The present invention discloses a fastener for a trailer bed. The trailer bed is constructed of wooden planks placed on a metal frame. The screw has twin threads with a helix angle of substantially 10° to a line perpendicular to the axis of the shank or the fastener, an included angle of substantially 60°, and a trilobular point which allows the screw to be drilled into wooden plank and swage threads in the wooden plank and metal frame. Torquing the threads forces the fastener into the metal frame and wooden planks and allows the screw head which is tapered to seat itself.

10 Claims, 1 Drawing Sheet

TRAILER BED FASTENER

My invention relates generally to a screw fastener and more particularly to a fastener to secure a wooden trailer bed rail to a metal trailer frame, the fastener having a twin-lead, selftapping tip and a helix angle substantially 10° to a line perpendicular to the axis of the screw which is sufficient to tap through both the wood and the metal.

It will be appreciated by those skilled in the art that manufacturers of truck beds often desire that the beds be made out of wood placed onto a metal frame. Over an extended period of time, wood boards tend to be economical in that they provide a long lasting and relatively inexpensive surface that can withstand extreme changes in loading. However, a metal frame, generally of an H-beam configuration, is used on the frame of the truck bed to form a foundation for the boards. The combination of metal and wood through which the fastener must pass has created several unique problems in that a wood screw of known configuration has too great of a helix angle to self-tap through metal whereas known metal screws have too small of a helix angle, and therefore drives too slowly to be used economically in a wood application. This problem is discussed in the connection with the following review of prior art.

U.K. Patent No. 2,131,907, filed on Nov. 28, 1983, and issued to Seymour, et al, discloses a wood screw having a helix angle in the range of 20°. However, the Seymour screw was intended for use with wood and not for use with metal. The helix angle of 20° will draw the screw rapidly through material of the density of wood, but attempts to use such a screw in a more dense material such as sheet metal would cause the screw to strip. Seymour also discloses, in his discussion of the prior art, on Page 1 beginning at Line 15, the concept of a self-tapping screw having a single or a multi-start helical thread wherein the included angle thread profile at its crest is 40°. This screw is described as being used in conjunction with chipboard and being provided with a helix angle between 10° and 12°. However, this disclosure is of a screw clearly for use in connection with particle board rather than metal. The included angle of the thread of 40° effectively will not work in the application for which the present invention is intended.

U.S. Pat. No. 4,439,077, issued to K. Godstead on Mar. 27, 1984, discloses a concrete screw having a helix angle no greater than 8½°. This reduced helix angle allows the screw to self tap through the dense concrete application without breaking, but would be too slow for an application involving less dense materials such as wood.

U.S. Pat. No. 3,876,319, issued on Apr. 8, 1975 to Meyer, discloses a core bit which includes a double set of helical threads. The helix angle of the threads are said to be at least 5° and preferably the helix angle would be in the range 8°–12°. However, the cross sectional shape of the threads is smooth and arcuate as opposed to being formed a v-shape. As can be seen from FIG. 1 of this Patent, the shape of this thread structure, the pitch of the threads and the intended use of this core bit would not be adaptable for use in a Trailer Bed Screw application.

What is needed, then, is a fastening screw having a helix angle which is low enough to allow the fastener to pass through metal yet large enough to allow the screw to economically pass through wood. This screw must be a self-tapping screw, ideally with a twin lead. This fastener is presently lacking in the prior art.

SUMMARY OF THE INVENTION

The present invention disclosed a trailer bed fastener having a twin lead, self-tapping tip and a helix angle of substantially 10° which allows the screw to pass through and to thread metal while still economically passing through wood. The screw is intended for use in the specific application of attaching the wooden boards of a trailer bed to a metal frame. A pilot hole is first drilled through the wood and metal. A manual air driver is then used to drive the screws into the wood and metal. The screw self-taps into the wood, forming threads in the wood by use of a trilobular cutting tip on the fastener. After the screw passes entirely through the wood, the screw must then self-tap into the metal frame. As the screw passes into the metal frame, the threads pull the screw into the wood such that the head seats into the wood leaving no portion of the screw vertically exposed.

Accordingly, one object of the present invention is to provide a screw which can rapidly pass through a wooden trailer bed and still have the ability to self-tap into a metal trailer bed frame without breaking or torquing the head off the fastener.

Still another object of the present invention, is to provide a fastener which can economically pass through and self-tap itself into a wooden trailer bed and metal frame.

DETAILED DESCRIPTION OF THE PREFERRED EMBODIMENT

Trailer manufacturers generally use floor planks which are aligned side-by-side substantially parallel to one another. These pieces of floor planks are placed on a metal frame. The floor planks are placed on trailer cross members made of generally 9/64" H-beam cold rolled steel stock with an A-36 yield. The floor planks are approximately 1⅜" thick and are of an apotone wood or air-dried oak. Apotone is a wood from South America which is one of the hardest and densest woods known. The fastener must self-tap threads into and pass through the wood with the characteristics of a wood screw for the thickness of the plank and then be able to self-tap threads into the metal in the manner of a self-tapping metal screw for the final ¼" to attach to the frame. The threads must pull the screw into the wood to seat the head and eliminate any vertically exposed surface.

Figure 1:
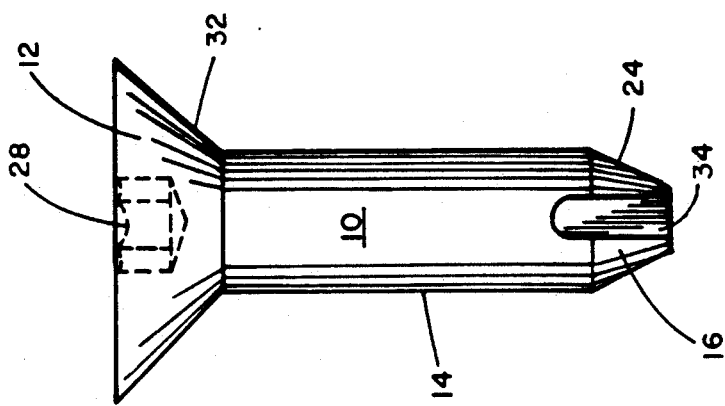
FIG. 1 shows a side view of the trailer bed fastener of the present invention without threads.

Referring now to FIG. 1, there is shown generally at 10 a trailer bed fastener of the present invention. The fastener 10 has head 12, shank 14 and tip 16. Head 12 has head taper 32 which narrows as head 12 approaches shank 14. Tip 16 has tip taper 24 which narrows as tip 16 progresses away from shank 14. Tip 16 is generally conical but has a trilobular cross-section with threads lobs forming cutting point 34 gas is well known in the industry, such as the point described in U.S. Pat. No. 3,803,889 to Muenchinger. Tip 16, tip taper 24, and trilobular cutting point 34 cooperate to allow fastener 10 to self-tap through pilot hole bored into the wood and metal. Head 12 has recess 28 which is, the preferred embodiment, in the shape of a 6-pointed star, but can be of any known configuration adequate to provide a recess for a known driver point.

Figure 2:
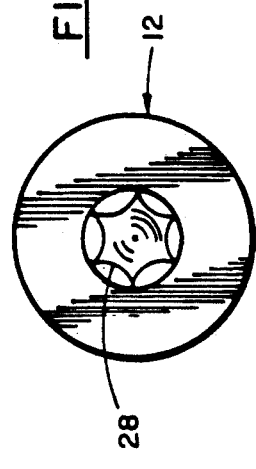
FIG. 2 is a plain view of the trailer bed fastener of the present invention.

Referring now to FIG. 2, there is shown generally at 10, a plain view of the fastener of the present invention. As can be seen, recess 28 is in the shape of a 6-pointed star. The outer diameter of recess 28 is substantially 0.266 inches in the preferred embodiment.

Figure 3:
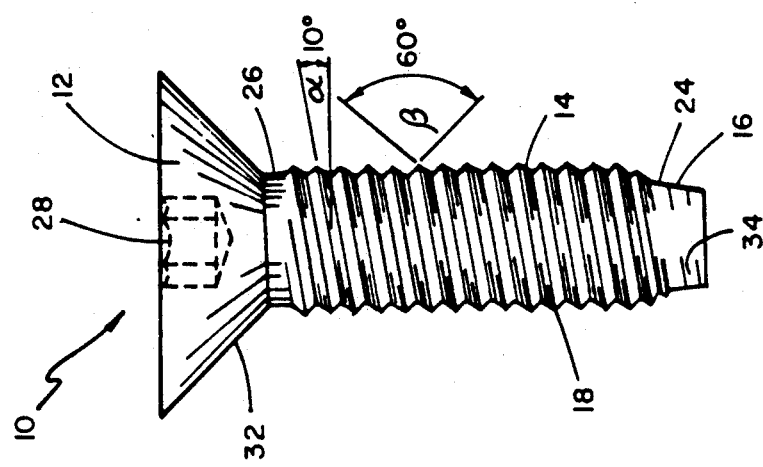
FIG. 3 is a side view of the trailer bed fastener.

Referring now to FIG. 3, in the preferred embodiment, head 12 has an outside diameter of substantially 0.570 to 0.590 inches, head taper 32 is substantially 80°-82°, recess 28 is substantially 0.087 inches deep, and shank 14 has a diameter, absent threads, of substantially 0.273 to 0.275 inches. In the preferred embodiment, tip 16 at its narrowest point is substantially 0.210 to 0.220 inches in diameter, 170 inches long, and tip taper 24 is substantially 5 1/20 to the axis of the screw.

In the preferred embodiment, trilobular cutting point 34 is substantially 0.230 inches deep into tip 16. In the preferred embodiment, fastener 10 from head 12 to tip 16 is substantially 1.945 inches to 1.955 inches. Head 12 is substantially 0.191 inches from its upper side to its connection with shank 14.

Referring still to FIG. 3, there is shown generally at 10, the fastener of the present invention having threads 18. In the preferred embodiment, a twin lead cuts a double set of threads having a pitch of 18 threads per inch. Threads 18, in the preferred embodiment, have helix angle $\alpha$ of 10° to a line perpendicular to the axis of the screw and included angle $\beta$ of substantially 60°. Threads 18 run to neck 26 which joins head 12 to shank 14. In the preferred embodiment, neck 26 is substantially 0.188 inches long.

The following is a description of a second preferred embodiment of the invention:

Referring to FIG. 2, the outer diameter of recess 28 is substantially 0.221 inches in the second preferred embodiment. Referring to FIG. 3, in the second preferred embodiment, head 12 has an outside diameter of substantially 0.452 to 0.507 inches, head 12 is substantially 0.060 inches deep, and shank 14 has a diameter, absent threads, of substantially 0.213 to 0.215 inches. In this second preferred embodiment, tip 16 at its narrowest point is substantially 0.165 to 0.185 inches in diameter, 0.170 inches long, and tip taper 24 has an angle of substantially 6¼° to the axis of the fastener.

In the second preferred embodiment, trilobular cutting point 34 is substantially 0.230 inches deep into tip 16. In the second preferred embodiment, fastener from head 12 to tip 16 is substantially 1.945 inches to 1.955 inches. Head 12 is substantially 0.153 inches from its upper side to its connection with shank 14.

Finally, referring to FIG. 3, in the second preferred embodiment, a double set of threads 18 are used having a pitch of 20 threads per inch. Threads 18 have helix angle $\alpha$ of substantially 10° and an included angle $\beta$ of substantially 60° and run up to neck 26 which joins head 12 to shank 14. In the second preferred embodiment, neck 26 is substantially 0.188 inches long.

Figure 4:
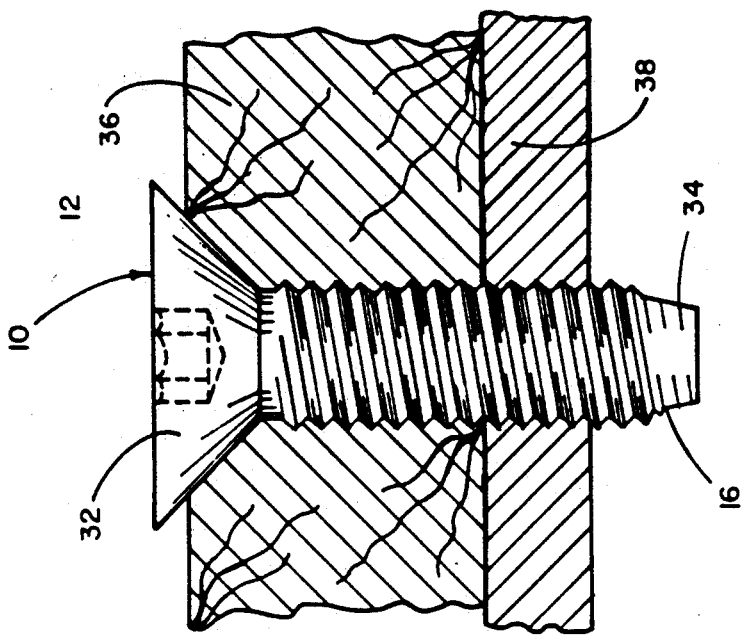
FIG. 4 is a side view showing the interaction between the trailer bed fastener and the metal frame and the wooden trailer bed.

Referring now to FIG. 4, one can see fastener 10 operating in connection with wood plank 36 and metal frame 38. Trilobular cutting point 34 of tip 16 allows fastener 10 to pass through preformed pilot holes and self-tap into and form threads in wooden plank 36. When trilobular cutting point 34 of tip 16 makes contact with the pilot hole in metal frame 38, trilobular cutting point 34 will self-tap into and form threads in metal frame 38. Rotating fastener 10 in connection with threads 18 causes fastener 10 to advance downwardly and pull or seat head taper 32 into wood plank 36.

In operation, the fasteners are automatically fed through a manual air driver which drives the screws at a relatively high RPM into the wooden planks and metal frame. Fastener 10 must have the characteristics of a wood screw for the first 1⅞" until it makes contact with metal frame 38. Through this first 1⅞", fastener 10 must thread itself through the hard wood. After the first 1⅞", fastener 10 must have the characteristics of a self-tapping thread former to form its own threads in the metal frame. Torque on the fastener 10 causes the threads 18 to force fastener 10 into the wood and countersinks fastener head 12 into wooden plank 36.

Although there have been described particular embodiments of the present invention of a new and useful trailer bed fastener, it is not intended that such references be construed as limitations upon the scope of this invention, except as set forth in the following claims. Further, although specific dimensions have been suggested, it is not intended that such dimensions limit the scope of the present invention except as set forth in the following claims.

What I claim is:

1. A fastener for a trailer bed made of wooden planks resting on a metal frame, said fastener comprising:
   a. a head;
   b. a shank having an axis and being substantially cylindrical in shape;
   c. threads wrapping themselves helically around said shank said threads having an included angle of substantially 60° and a helix angle of substantially 10° to a line perpendicular to the axis of the shank;
   d. a tip attached to said shank distantly located from said head, said tip having a taper and a trilobular point.

2. The device of claim 1 wherein said tip has a twin lead which swages two sets of threads of substantially identical concentric configuration.

3. The device of claim 2 with 18 threads per inch.

4. A fastener for a trailer bed constructed of wooden planks on a metal frame, said fastener having a head connected to a shank connected to a tip, said fastener comprising:
   a. said head having a head taper which grows smaller as the head approaches said shank;
   b. said shank having an axis and being substantially cylindrical in shape;
   c. said tip having a trilobular point; and
   d. threads wrapping helically around said shank having a helix angle of substantially 10° to a line perpendicular to the axis of said shank.

5. The device of claim 4 wherein said threads having an included angle of substantially 60°.

6. The device of claim 5 with 18 threads per inch.

7. The device of claim 1 including two sets of threads in parallel alignment and substantially identical shape and configuration.

8. The device of claim 7 with 18 threads per inch.

9. The device of claim 5 including two sets of threads in parallel alignment and substantially identical shape and configuration.

10. The device of claim 9 with 18 threads per inch.

* * * * *